(12) United States Patent
Jowett et al.

(10) Patent No.: US 11,014,724 B2
(45) Date of Patent: May 25, 2021

(54) LAYER PAD

(71) Applicant: LOADHOG LIMITED, South Yorkshire (GB)

(72) Inventors: Leigh Jowett, South Yorkshire (GB); Martin Leslie Baker, South Yorkshire (GB); Luke Davis, South Yorkshire (GB); Robert Deakin, South Yorkshire (GB)

(73) Assignee: LOADHOG LIMITED

( * ) Notice: Subject to any disclaimer, the term of this patent is extended or adjusted under 35 U.S.C. 154(b) by 0 days.

(21) Appl. No.: 15/765,453

(22) PCT Filed: Oct. 7, 2016

(86) PCT No.: PCT/GB2016/000182
§ 371 (c)(1),
(2) Date: Apr. 2, 2018

(87) PCT Pub. No.: WO2017/060666
PCT Pub. Date: Apr. 13, 2017

(65) Prior Publication Data
US 2018/0290802 A1    Oct. 11, 2018

(30) Foreign Application Priority Data
Oct. 9, 2015 (GB) ..................................... 1517932

(51) Int. Cl.
*B65D 57/00* (2006.01)
*B65D 71/00* (2006.01)
(Continued)

(52) U.S. Cl.
CPC .......... *B65D 57/00* (2013.01); *B29C 45/0046* (2013.01); *B29L 2007/002* (2013.01);
(Continued)

(58) Field of Classification Search
CPC ........ B65D 71/70; B65D 81/02; B65D 57/00; B65D 71/0088; B65D 2571/00043;
(Continued)

(56) References Cited

U.S. PATENT DOCUMENTS

| 4,117,950 A | 10/1978 | Allen |
| 5,034,258 A * | 7/1991 | Grace ................ A47G 27/0412 |
| | | 156/290 |

(Continued)

FOREIGN PATENT DOCUMENTS

| CH | 703419 A2 | 1/2012 |
| EP | 0362091 A1 | 4/1990 |

(Continued)

OTHER PUBLICATIONS

Translation of FR2596025. (Year: 1987).*
Translation of JP2003112771. (Year: 2003).*

*Primary Examiner* — Catherine A. Simone
(74) *Attorney, Agent, or Firm* — Clark Hill PLC; James R. Foley

(57) ABSTRACT

A layer pad (10) comprises a substantially flat sheet (12) having first and second opposite substantially planar faces (14, 16). The layer pad (10) further includes at least one raised formation (18) on at least one of the faces (14, 16).

7 Claims, 4 Drawing Sheets

(51) Int. Cl.
  *B29C 45/00* (2006.01)
  *B29L 7/00* (2006.01)
  *B29L 31/00* (2006.01)
(52) U.S. Cl.
  CPC ..... *B29L 2031/712* (2013.01); *B65D 71/0088* (2013.01); *B65D 2571/00043* (2013.01); *Y10T 428/24479* (2015.01)
(58) Field of Classification Search
  CPC ......... Y10T 428/24479; B29C 45/0046; B29L 2031/712; B29L 2007/002
  USPC ....................................................... 428/156
  See application file for complete search history.

(56) References Cited

U.S. PATENT DOCUMENTS

| | | | | |
|---|---|---|---|---|
| 5,258,217 A | * | 11/1993 | Lewis | ........................ B32B 3/30 428/120 |
| 6,068,124 A | | 5/2000 | Lin | |
| 8,367,184 B2 | * | 2/2013 | Slama | ................... B29C 43/222 181/284 |
| D760,990 S | | 7/2016 | Baker et al. | |
| 2003/0143374 A1 | | 7/2003 | Stitchick | |
| 2005/0019531 A1 | | 1/2005 | Bazbaz | |
| 2012/0292221 A1 | | 11/2012 | Kruelle et al. | |
| 2013/0213841 A1 | | 8/2013 | Ward | |

FOREIGN PATENT DOCUMENTS

| | | |
|---|---|---|
| FR | 2305363 A1 | 10/1976 |
| FR | 2314040 A1 | 1/1977 |
| FR | 2596025 A1 | 9/1987 |
| FR | 2674510 A1 | 10/1992 |
| GB | 2420773 A | 6/2006 |
| GB | 2529939 A | 3/2016 |
| JP | 2003-112771 A | 4/2003 |

\* cited by examiner

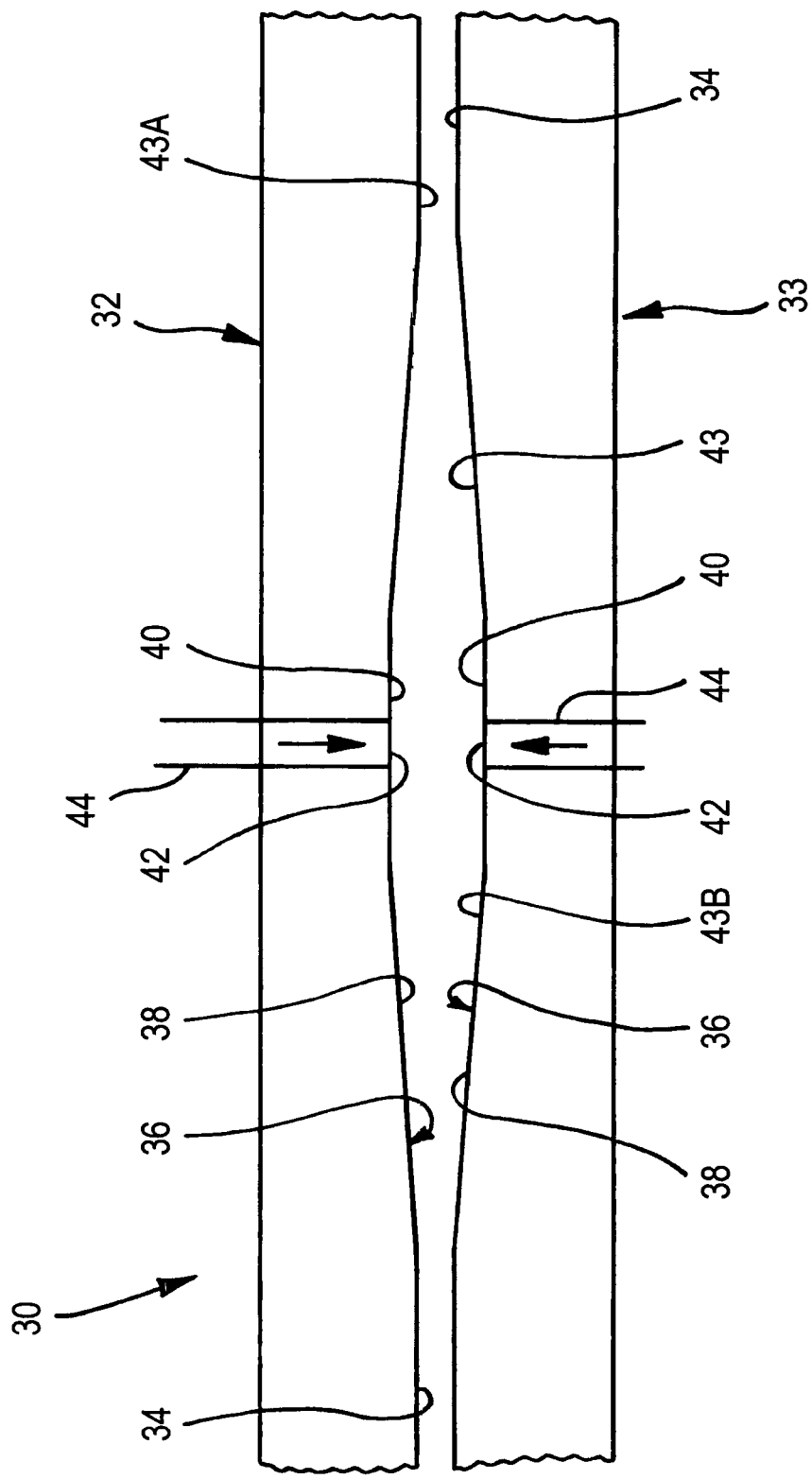

LAYER PAD

BACKGROUND OF THE INVENTION

This invention relates to pads. More particularly, but not exclusively, this invention relates to layer pads for use on layers of a load. Embodiments of this invention relate to slip sheets for use between layers of a load.

Layer pads are used between layers of loads on pallets to hold the lower layer in place and provide a base for the upper layer. One example of a layer pad is disclosed in EP1833728A. It has been discovered, however, that some prior art layer pads have a tendency to warp after having been manufactured.

BRIEF SUMMARY OF THE INVENTION

According to one aspect of this invention, there is provided a pad comprising a substantially flat sheet having first and second opposite substantially planar faces, wherein the pad further includes at least one raised formation on at least one of the faces.

The pad may be in the form of a layer pad for use on a layer of articles forming a load.

In one embodiment, the pad may include a respective raised formation on each of the first and second faces. The pad may include a plurality of the raised formations on each of the first and second faces. The, or each, raised formation may be conical or frustoconical in shape.

The thickness of the pad at regions at which one of the raised formations is present may be substantially 30% thicker than regions of the pad devoid of the aforesaid raised formations.

The, or each, raised formation may have a main region extending from the first or second face. The, or each, raised formation may further include an apex region spaced from the respective first or second face.

The apex region may be substantially planar. Each of the main regions may taper inwardly from the respective face to the apex region.

A plurality of rows of the raised formations may be provided on the, or each, face. Where the raised formations are provided on each of the first and second faces, the raised formations on the first face may be aligned with the raised formations on the second face. Each apex region may be substantially planar.

Each raised formation may have substantially the same height as the, or each, other to raised formation. Thus, the apex regions of the raised formations on each face define a respective plane.

The sheet may be substantially rectangular. The pad may have marginal portions on the sheet. The marginal portions may extend around the sheet.

The sheet may have corner regions. The marginal portions may extend around the corner regions. The marginal portions may be curved around the corner regions.

The marginal portions may have outer edges. The marginal portions may comprise corrugations, which may extend perpendicular from the outer edges. The corrugations may merge into the sheet.

According to another aspect of this invention, there is provided a method of forming a pad as described above, wherein said method comprises providing a mould having at least one injection port for a moulding material, said mould defining a mould space having a relatively narrow region and at least one relatively wide region, injecting the moulding material into the mould space to fill the relatively narrow region and the relatively wide region, allowing the moulding material to cure and thereafter releasing the so formed pad from the mould.

The moulding material may comprise a molten plastics material.

The mould space may have a plurality of relatively wide regions within the relatively narrow region. The mould space may have first and second opposite sides and a respective wide region on each side.

The mould space may have first and second opposite sides and a plurality of respective wide regions on each side. The mould space may include first and second mould parts to provide the first and second opposite sides of the mould space respectively.

The first mould part may define a recess to provide the relatively wide region in the mould space. The first mould part may define a plurality of the aforesaid recesses. The second mould part may define a recess to provide the relatively wide region in the mould space. The second mould part may define a plurality of the aforesaid recesses.

Each of the first and second mould parts may define a plurality of the recesses to provide a plurality of relatively wide regions on each side of the mould space.

The first mould part may comprise a substantially planar region. The second mould part may comprise a substantially planar region Each of the first and second mould parts may define a respective recess to provide the respective relatively wide regions on each side of the mould space.

The, or each relatively wide region may be substantially frustoconical in shape. The, or each, recess may be substantially frustoconical in shape.

A plurality of rows of the relatively wide regions may be provided on the, or each, side of the mould space. Where the relatively wide regions are provided on each of the first and second sides of the mould space, the relatively wide regions on the first side may be aligned with the relatively wide regions on the second side.

A plurality of rows of the recesses may be defined in the, or each, mould part. Where the recesses are defined in each of the first and second mould parts, the recesses defined the first mould part may be aligned with the recesses defined in the second mould part.

The mould space may be substantially rectangular. The pad may have one or more marginal portions on the sheet. The, or each, marginal portion may extend around the sheet.

BRIEF DESCRIPTION OF SEVERAL VIEWS OF THE DRAWINGS

An embodiment of the invention will now be described by way of example only, with reference to the accompanying drawings, in which:

FIG. 4 is a schematic sectional side view of a mould for forming the pad shown in FIGS. 1, 2 and 3.

DETAILED DESCRIPTION OF THE INVENTION

Figure 1:
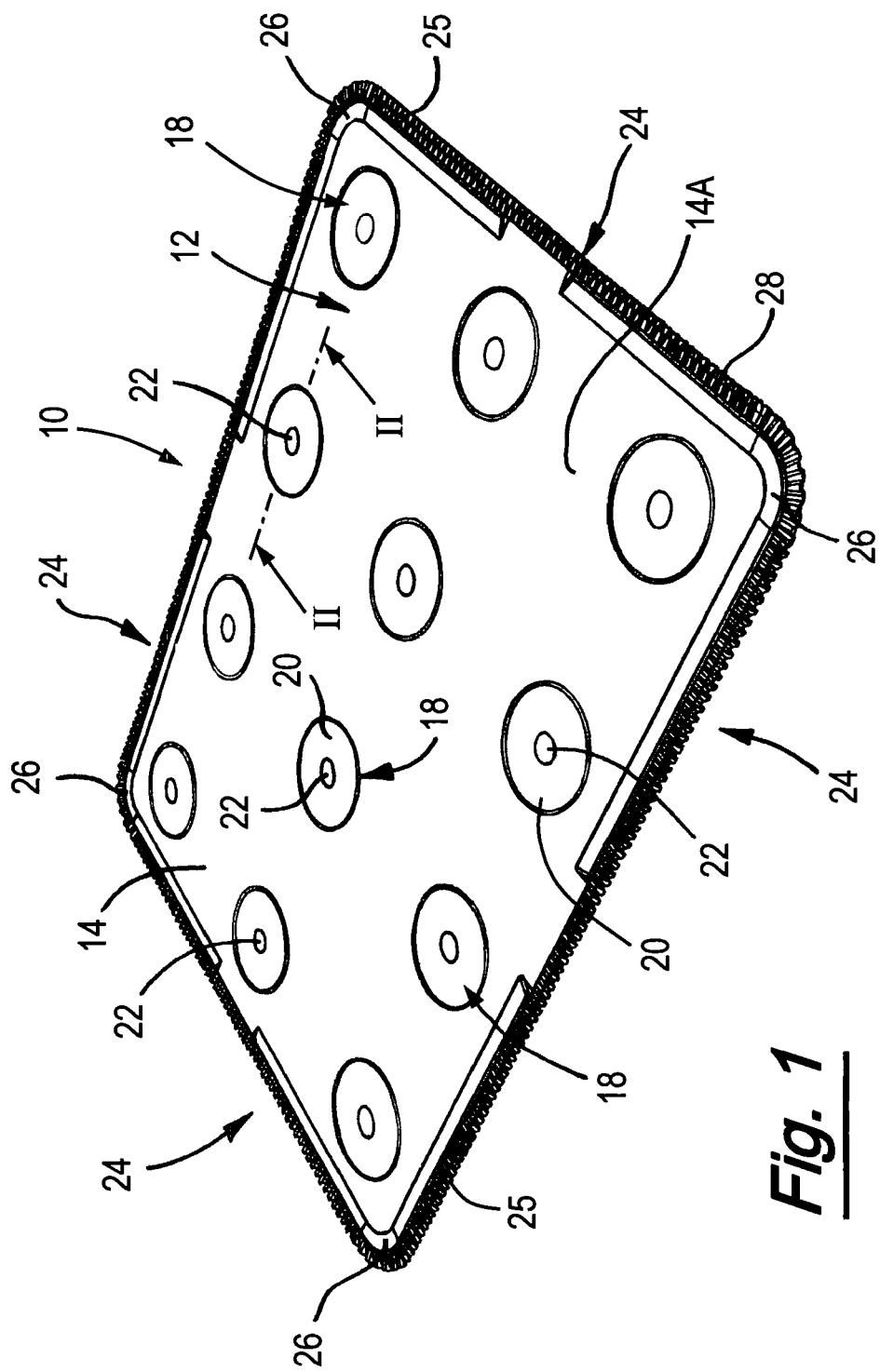
FIG. 1 is a perspective view from above of a pad.
Figure 2:
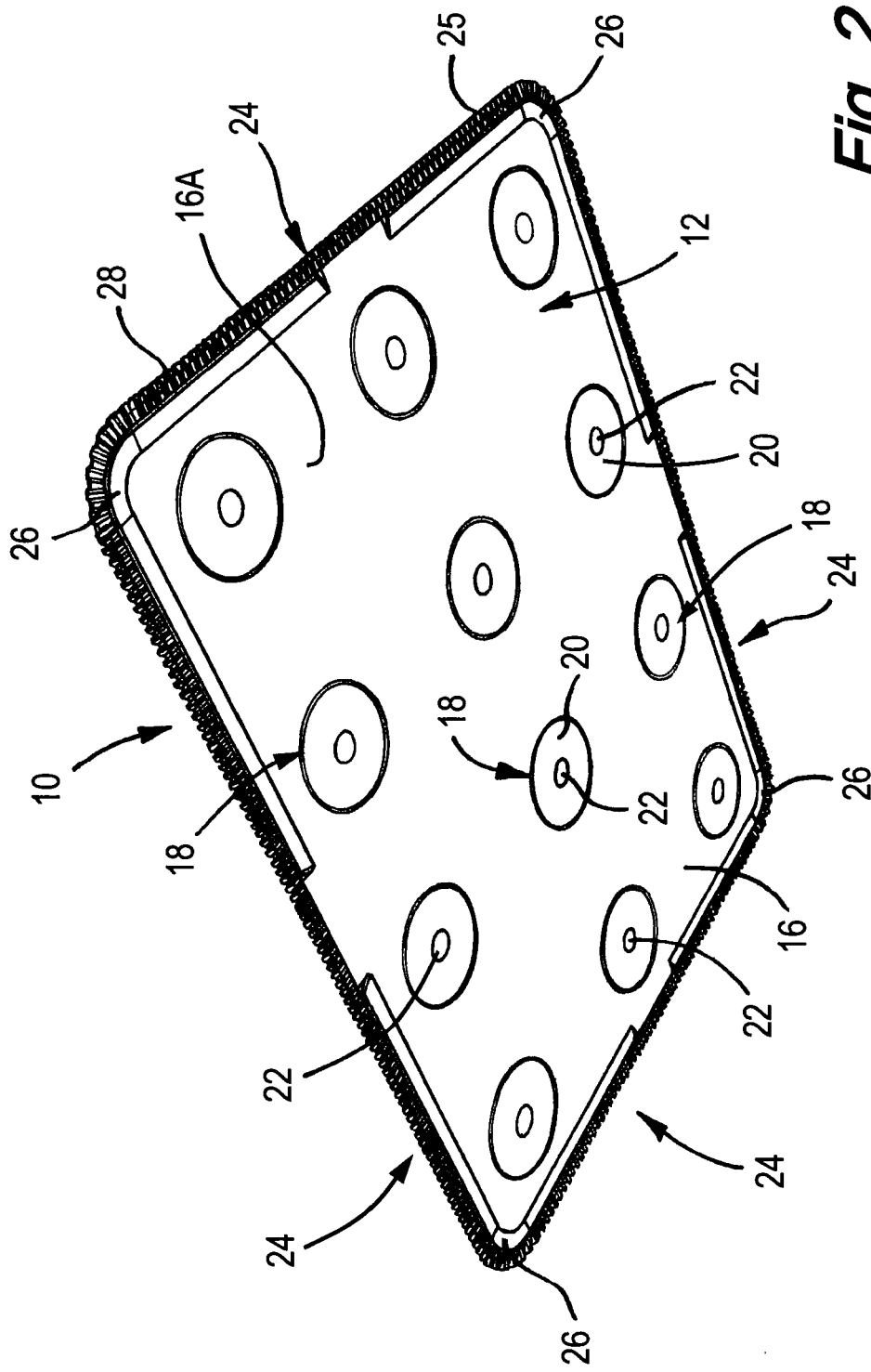
FIG. 2 is a perspective view from below of the pad shown in FIG. 1.
Figure 3:
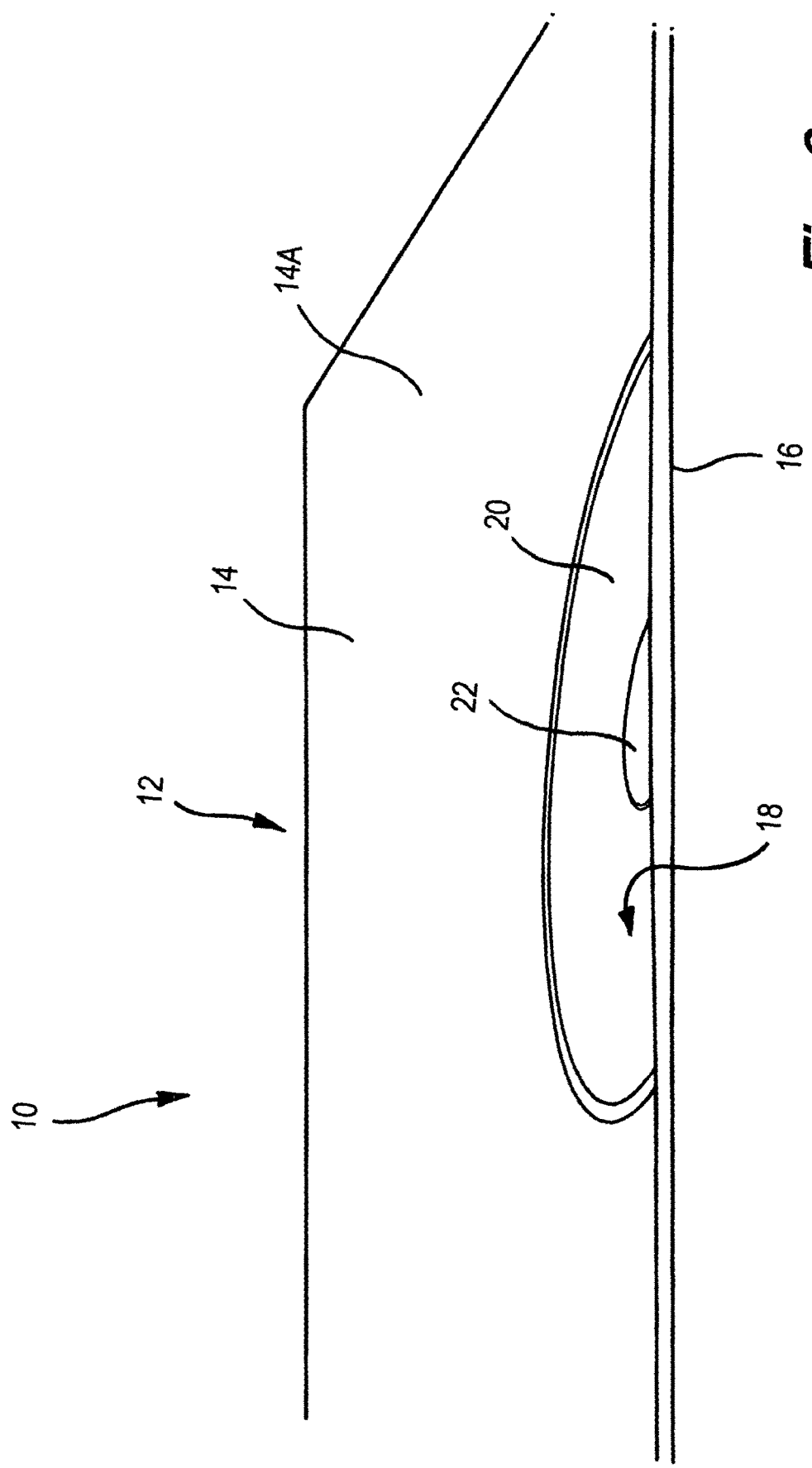
FIG. 3 is a view along the line II-II in FIG. 1.

FIGS. 1, 2 and 3 show a pad in the form of a layer pad 10, which is disposed between layers of a load (not shown), for example bottles. The load may be arranged in the layers on a pallet.

The layer pad 10 comprises a substantially flat sheet 12 having first and second opposite faces 14, 16, which are identical to each other. The faces 14, 16 are substantially planar. As shown in FIG. 1, the layer pad 10 is substantially rectangular.

The layer pad 10 further include a plurality of raised formations 18 on each of the first and second faces 14, 16. Each raised formation 18 on the first face 14 is substantially aligned with a respective one of the raised formations 18 on the second face 16. The raised formations 18 are of a frustoconical shape comprising a shallow tapering main region 20 and a substantially planar apex region 22. A planar region 14A of the first face 14 is provided between the raised formations 18 on the first face 14. A planar region 16A of the second face 16 is provided between the raised formations of the second face 16.

The aligned raised formations 18 increase the thickness of the sheet 12 by about 30% between the apex regions 22 compared to the thickness of the sheet 12 at the planar region 12A.

The main region 20 of each raised formation extends outwardly from the respective first or second face 14, 16 to the apex region 22. Each main region 20 tapers inwardly towards the apex region 22. The apex region 22 is substantially circular.

Each of the raised formations 18 may have substantially the same height as each of the other raised formations 18. Thus, the apex regions 22 on each of the first and second faces 14, 16 define a respective plane.

The raised formations 18 on the first face 14 are the same as the raised formations on the second face 16. The raised formations 20 are arranged in substantially identical regular arrays, as shown in FIGS. 1 and 2, on both of the first and second faces 14, 16.

The layer pad 10 has marginal portions 24, which extend around the substantially flat sheet 12. The sheet 12 has corner regions 26, and the marginal portions 24 extend around the corner regions 26. The corner regions 26 are curved and, as a result, the marginal portions 24 curve around the corner regions 26. The marginal portions 24 have an outer edge 25 and corrugations 28 which extend inwardly from the outer edge 25 to merge with the sheet 12.

FIG. 4 shows a mould 30 for manufacturing the layer pad 10. The mould 30 comprises a first and second mould parts 32, 33, each having a planar region comprising a planar inner surface 34 and a plurality of recesses 36. Each recess 36 is of a substantially frustoconical shape having a main recess region 38 and an apex region 40. The apex region 40 is substantially circular.

An injection port 42 extends through the apex region 40 of the recess 36 in the first and second mould parts 32, 33. The first and second mould parts 32, 33 can be arranged in a moulding position shown in FIG. 4 to define a mould space 43 therebetween. The mould space 43 has a relatively narrow region 43A between the opposite planar surfaces 34, and relatively wider regions 43B between the opposite recesses 36.

If desired a respective injection port 42 may be provided in each of the apex regions 40 of all the recesses 36 of the first and second mould parts 32, 33. A respective conduit 44 extends to each injection port 42 through which a moulding material, such as a molten plastics material, is injected into the mould space 43.

In order to form the layer pad 10, the mould parts 32, 33 are secured to each other by suitable means known in the art of injection moulding in the position shown FIG. 4 to define the mould space therebetween. A suitable moulding material, such as a molten plastics material, is then injected into the mould space via all the injection ports 42 in each of the mould parts 32, 33. When the injection is completed, the moulding material is allowed to cure, and the layer pad 10 is then removed from the mould.

The provision of the raised formations 18 on the planar surfaces 12A of the substantially flat sheet 12 provides the advantage of the embodiment described herein that it helps prevent warping of the sheet 12 when the layer pad 10 is removed from the mould.

The injection of the moulding material into the mould 30 at the apex regions 40 of the recesses 36 provides the advantage in the embodiment described herein that the moulding material enters the mould 30 in a condition that does not induce stress in the moulding. It is believed that the provision of the injection ports 42 at the recesses 36 reduces the pressure at the injection ports during the injection of the moulding material.

The reduction in pressure has the effect of reducing the stress experienced by the material, thereby allowing uniform crystallisation. As a result of this lack of stress, there is little or no tendency of the layer pad 10 to warp when it is removed from the mould 30.

There is thus described a layer pad 10 and a method of manufacturing the layer pad 10 that provides the advantage that the layer pad 10 does not have a tendency to warp when the method of manufacture is complete.

Various modifications can be made without departing from the scope of the invention, for example, the arrangement and amount of the raised formations 18 on the sheet 12 can be different from the arrangement and amount shown in FIGS. 1 and 2. If desired, the raised formations 18 can be provided on only one of the faces 14, 16 of the sheet 12. The injection ports 42 can be provided at only some of the recesses 36. If desired, the injection ports 42 could be provided at some or all of the recesses 36 in only one of the first and second mould parts 32, 33.

The invention claimed is:

1. A pad comprising a substantially flat sheet having first and second opposite substantially planar faces, wherein the pad further includes a plurality of raised formations on each of the faces, each raised formation being conical or frustoconical in shape, and each raised formation having a main region extending from the first or second face, and each raised formation having an apex region spaced from the respective first or second face, wherein the thickness of the pad between the apex regions is about 30% thicker than regions of the pad devoid of the aforesaid raised formations.

2. A pad according to claim 1, wherein each apex region is substantially planar, and the main region of the, or each, raised formation tapers inwardly from the face to the apex region.

3. A pad according to claim 1, wherein a plurality of rows of the raised formations are provided on the, or each, face, and the raised formations on the first face are aligned with the raised formations on the second face.

4. A pad according to claim 1, wherein the sheet is substantially rectangular, and the pad has marginal portions on the sheet, the marginal portions extending around the sheet.

5. A pad according to claim 4, wherein the sheet has corner regions, the marginal portions extending around the corner regions.

6. A pad according to claim 5, wherein the marginal portions are curved around the corner regions.

7. A pad according to claim 4, wherein the marginal portions have outer edges, and the marginal portions comprise corrugations extending perpendicularly from the outer edges, the corrugations merging into the sheet.

* * * * *